United States Patent
McConnell et al.

(10) Patent No.: US 7,681,292 B2
(45) Date of Patent: Mar. 23, 2010

(54) METHOD OF REDUCING AND UNIFORMLY DISTRIBUTING COMPRESSIVE FORCES ON AN AUTOMOBILE SEAT

(75) Inventors: Thomas E. McConnell, Santa Ynez, CA (US); Michael E. Henley, Santa Ynez, CA (US)

(73) Assignee: Prince Lionheart, Inc., Santa Maria, CA (US)

( * ) Notice: Subject to any disclaimer, the term of this patent is extended or adjusted under 35 U.S.C. 154(b) by 367 days.

(21) Appl. No.: 11/748,452

(22) Filed: May 14, 2007

(65) Prior Publication Data

US 2007/0210627 A1    Sep. 13, 2007

Related U.S. Application Data

(60) Division of application No. 11/291,431, filed on Dec. 1, 2005, now Pat. No. 7,422,278, which is a continuation of application No. 10/818,759, filed on Apr. 6, 2004, now abandoned, which is a continuation of application No. 10/136,507, filed on May 1, 2002, now Pat. No. 6,786,546.

(51) Int. Cl.
B68G 7/00 (2006.01)
A47D 15/00 (2006.01)

(52) U.S. Cl. .................................. 29/91.1; 297/182
(58) Field of Classification Search ............. 29/91.1; 297/224, 219.1, 229, 182, 219.12, 256.16, 297/256.1, 253, 183.5, 188.2
See application file for complete search history.

(56) References Cited

U.S. PATENT DOCUMENTS 1,741,838 A   12/1929   Gilbert
1,820,104 A   8/1931    Whaley
1,836,302 A   12/1931   Bloomfield
1,853,579 A   4/1932    Sallop (Continued)

FOREIGN PATENT DOCUMENTS

FR    1457481    8/1965

(Continued)

OTHER PUBLICATIONS

Re-exam U.S. Appl. No. 95/000,236, filed Jun. 11, 2007, Re-exam appl. filed by Sunshine Kids Juvenile Products, Inc. ("SKJP").

(Continued)

Primary Examiner—John C Hong
(74) Attorney, Agent, or Firm—Knobbe Martens Olson & Bear, LLP

(57) ABSTRACT

There is provided a seat cover for accommodating a child safety chair upon a seat. The seat cover comprises a lower protective member which is disposable upon a seating portion of the seat. This lower member can accommodate the child safety chair when positioned in a rearward-facing direction to prevent it from permanently compressing the seating portion. The seat cover further comprises an upper protective member that is disposable against a seat-back portion of the seat. This upper member is selectively attachable with and detachable from the lower member. By doing so, the upper member can further prevent the chair from permanently compressing the seat-back portion when it is repositioned in a forward-facing direction and placed in contact therewith.

22 Claims, 2 Drawing Sheets

U.S. PATENT DOCUMENTS

| | | |
|---|---|---|
| 1,861,455 A | 6/1932 | Schwartz |
| 1,878,045 A | 9/1932 | Wedler |
| 1,917,904 A | 7/1933 | Sallop |
| 1,970,820 A | 8/1934 | Schoellkopf |
| 1,985,222 A | 12/1934 | Menhall |
| 2,027,947 A | 1/1936 | Wittcoff |
| D112,450 S | 12/1938 | Kletsky |
| 2,161,448 A | 6/1939 | Bishop |
| 2,192,070 A | 2/1940 | Cramer et al. |
| 2,227,180 A | 12/1940 | Falk |
| 2,270,598 A | 1/1942 | Morgan |
| 2,619,156 A | 11/1952 | Seaman |
| 2,627,303 A | 2/1953 | Bard |
| D170,932 S | 11/1953 | Marston |
| 2,734,556 A | 2/1956 | Hebrank |
| 2,904,103 A | 9/1959 | Nail |
| 3,112,956 A | 12/1963 | Edward et al. |
| 3,226,157 A | 12/1965 | Reinfeldt et al. |
| 3,371,957 A | 3/1968 | Cook |
| 3,695,692 A | 10/1972 | Williams |
| 3,763,972 A | 10/1973 | Karzmar |
| 3,892,440 A | 7/1975 | Dudley et al. |
| 4,019,776 A | 4/1977 | Takamatsu |
| 4,065,179 A | 12/1977 | Takasaki |
| D251,341 S | 3/1979 | Bodrero |
| 4,320,922 A | 3/1982 | Meritis |
| D267,523 S | 1/1983 | Neilson |
| 4,383,712 A | 5/1983 | Kaganas |
| 4,394,783 A | 7/1983 | Simmons |
| 4,396,227 A | 8/1983 | Neilson |
| 4,400,030 A | 8/1983 | Maruzzo et al. |
| 4,457,032 A | 7/1984 | Clarke |
| 4,669,779 A | 6/1987 | Kaganas et al. |
| 4,676,376 A | 6/1987 | Keiswetter |
| 4,676,549 A | 6/1987 | English |
| 4,693,511 A | 9/1987 | Seltzer et al. |
| 4,718,721 A | 1/1988 | Pompa |
| 4,790,592 A | 12/1988 | Busso et al. |
| 4,824,171 A | 4/1989 | Hollingsworth |
| 4,834,415 A | 5/1989 | Yee |
| 4,854,637 A | 8/1989 | McCree |
| 4,884,839 A | 12/1989 | Keiswetter |
| 4,892,357 A | 1/1990 | Nieto-Busby et al. |
| D307,370 S | 4/1990 | Bailey et al. |
| D310,314 S | 9/1990 | Caron |
| 4,958,886 A | 9/1990 | Barattini et al. |
| 4,969,683 A | 11/1990 | Wallace et al. |
| 5,004,197 A | 4/1991 | Weekley |
| 5,005,901 A | 4/1991 | Hinde |
| 5,026,585 A | 6/1991 | Funatogawa |
| D317,834 S | 7/1991 | Cajetan |
| 5,028,472 A | 7/1991 | Gray |
| 5,056,533 A | 10/1991 | Solano |
| D321,805 S | 11/1991 | Piciullo |
| D323,757 S | 2/1992 | Beauchan |
| 5,125,121 A | 6/1992 | Wroble |
| 5,150,945 A | 9/1992 | Aupperlee et al. |
| 5,150,947 A | 9/1992 | Croshaw |
| 5,190,350 A | 3/1993 | Hwang et al. |
| 5,228,745 A | 7/1993 | Hazel |
| D343,326 S | 1/1994 | Bruce |
| 5,294,166 A * | 3/1994 | Shapland ............... 296/97.23 |
| 5,297,848 A | 3/1994 | Grinnell |
| 5,330,250 A | 7/1994 | Reyes |
| 5,384,923 A | 1/1995 | Hwang et al. |
| 5,403,066 A | 4/1995 | Drum |
| 5,421,637 A | 6/1995 | Lemburg |
| D360,798 S | 8/1995 | Hall |
| 5,456,519 A | 10/1995 | Davis |
| 5,549,353 A | 8/1996 | Gaudet et al. |
| D388,998 S | 1/1998 | Dubiel |
| 5,781,946 A | 7/1998 | McEntire et al. |
| D396,983 S | 8/1998 | Taylor |
| 5,803,539 A | 9/1998 | Dewar et al. |
| 5,806,925 A | 9/1998 | Hanley |
| 5,944,379 A | 8/1999 | Yates |
| 5,957,528 A | 9/1999 | Campbell |
| 5,964,502 A | 10/1999 | Stephens |
| 6,000,753 A | 12/1999 | Cone, II |
| 6,083,664 A | 7/2000 | Inno et al. |
| 6,237,998 B1 | 5/2001 | Aprile |
| 6,241,188 B1 | 6/2001 | Simpson et al. |
| 6,276,752 B1 * | 8/2001 | Conte ............... 297/182 |
| 6,338,527 B1 | 1/2002 | Toyota et al. |
| 6,676,209 B1 | 1/2004 | Szabo et al. |
| 6,702,379 B2 | 3/2004 | Kain |
| 6,786,546 B2 | 9/2004 | McConnell et al. |
| 6,796,606 B2 | 9/2004 | Marshall |
| 7,422,278 B2 | 9/2008 | McConnell et al. |
| 2002/0167214 A1 | 11/2002 | Nelson et al. |
| 2004/0017100 A1 | 1/2004 | Gold et al. |
| 2004/0189067 A1 | 9/2004 | McConnell et al. |
| 2004/0212230 A1 | 10/2004 | Hanks |

FOREIGN PATENT DOCUMENTS

| | | |
|---|---|---|
| FR | 2417959 | 9/1979 |

OTHER PUBLICATIONS

Re-exam U.S. Appl. No. 95/000, filed Feb. 27, 2007, Re-exam appl. filed by SKJP.

Applicants' Response to Office Action mailed Sep. 5, 2007 in co-pending Inter Partes Reexamination Application (U.S. Appl. No. 95/000,236).

Complaint and Answer filed by Prince Lionheart, Inc. and Sunshine Kids Juvenile Products, LLC, respectively, in a pending litigation involving U.S. Patent No. 6,786,546, a parent to the present application (United States District Court for the Central District of California; Civil Docket No. CV06-1543).

Draft Request for Inter Partes Reexamination of US 6,786,546, prepared and forwarded to Applicants by Sunshine Kids Juvenile Products, LLC.

European Search Report; issued by European Patent Office for related European Patent Application No. 02257703.5 (now issued as EP 1359052).

Inter Partes Reexamination Application No. 95/000,236, filed Jun. 11, 2007 —Non-final Office Action (mailed on Sep. 5, 2007).

Inter Partes Reexamination Application No. 95/000,236, filed Jun. 11, 2007 —PTO Communication/Reexam order (mailed on Sep. 5, 2007).

Request for Inter Partes Reexamination of US Patent No. 6,786,546, filed on Feb. 27, 2007 by Sunshine Kids Juvenile Products, LLC (Reexamination U.S. Appl. No. 95/000,236). The present application claims priority to US Patent No. 6,786,546.

Six photographs of car seat cover manufactured by Prince Lionheart, Inc., the assignee of the present application (first sold circa 1980).

Sunshine Kids Juvenile Products (photos), Super Mat, copyright notice date 2005, Kent, Washington, USA.

Sunshine Kids Juvenile Products, Inc. (SKJP) Brochure "Supermat" Car Seat Undermat dated Jan. 1, 2001, purported by SKJP to have been distributed at NINFRA Trade Show in Las Vegas, Nevada, Apr. 21, 2001.

Third Party Requestor's Reply to Applicants' Office Action response in co-pending Inter Partes Reexamination Application (U.S. Appl. No. 95/000,236).

Wikipedia, Nylon, http://en.wikipedia.org/wiki/Nylon, Dec. 4, 2007(Submitted by third party requestor in co-pending Inter Partes Reexamination Application U.S. Appl. No. 95/000,236).

* cited by examiner

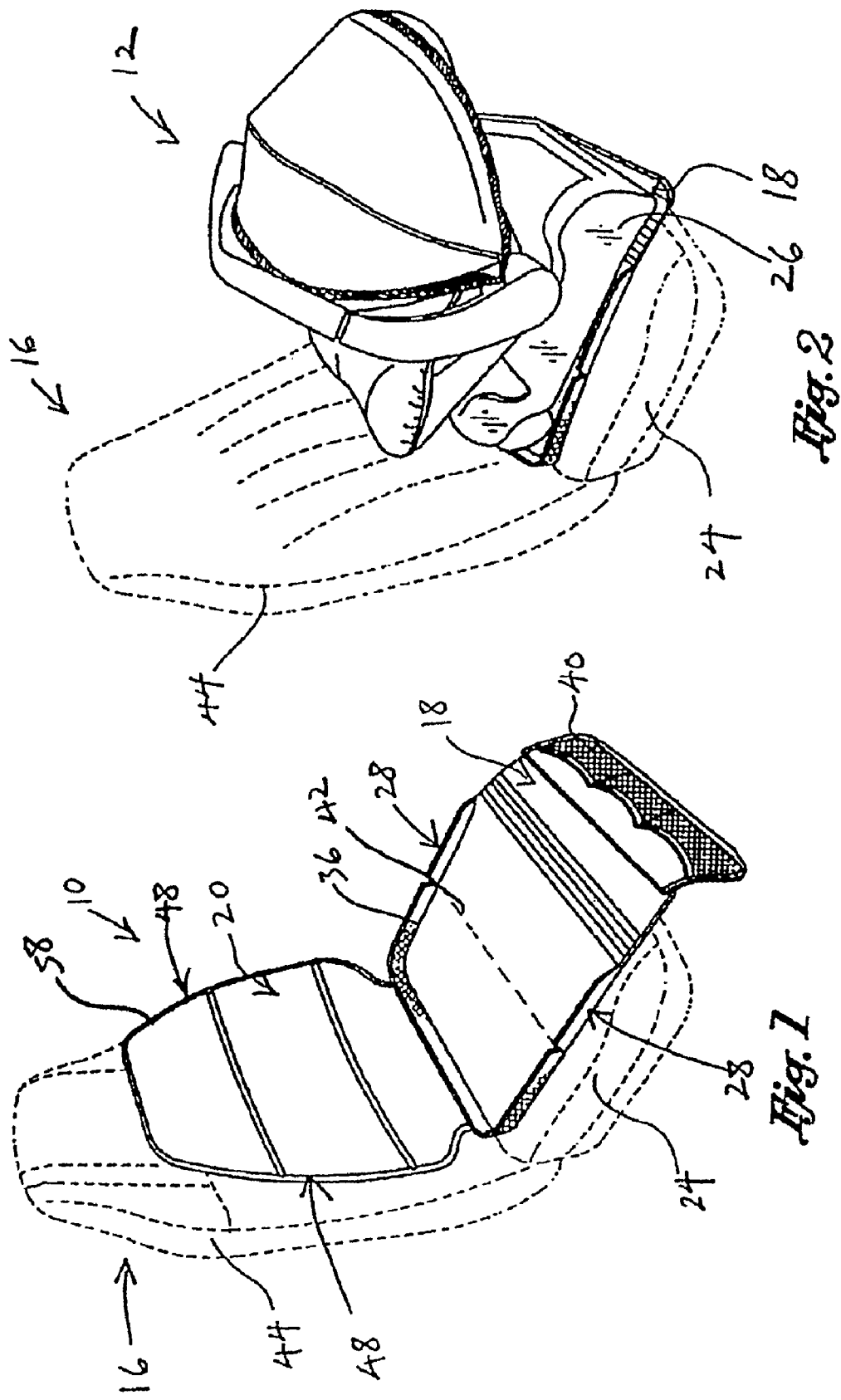

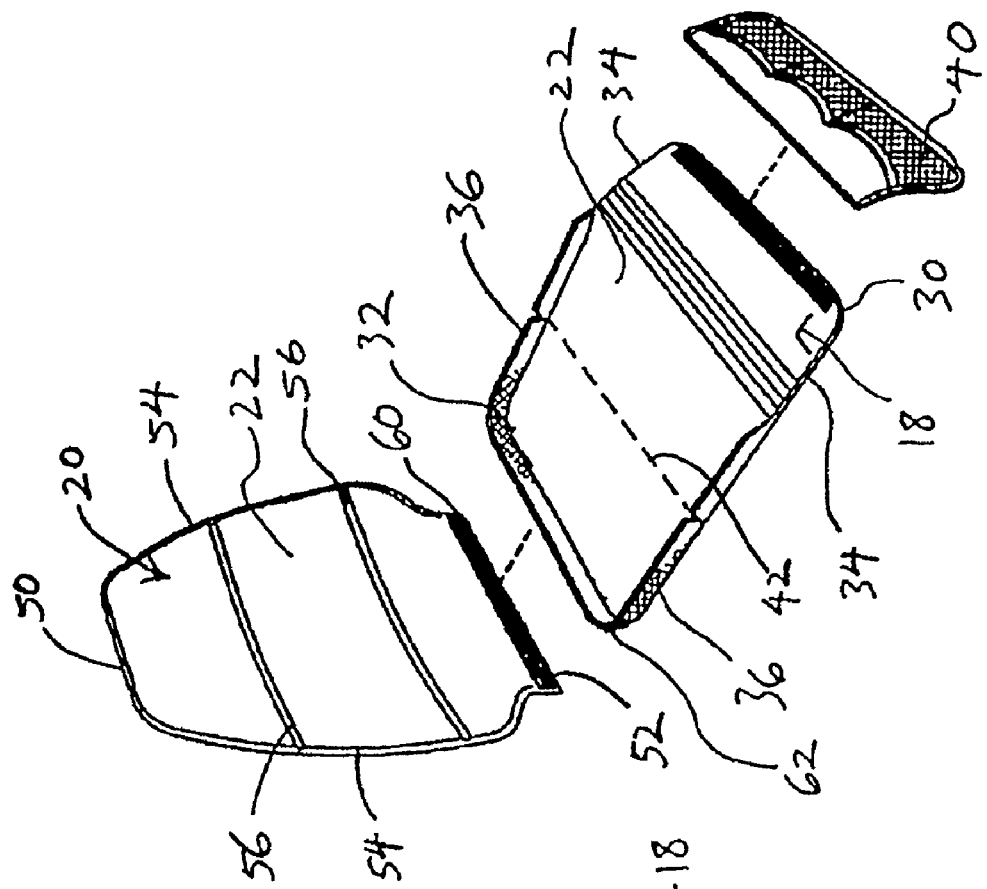
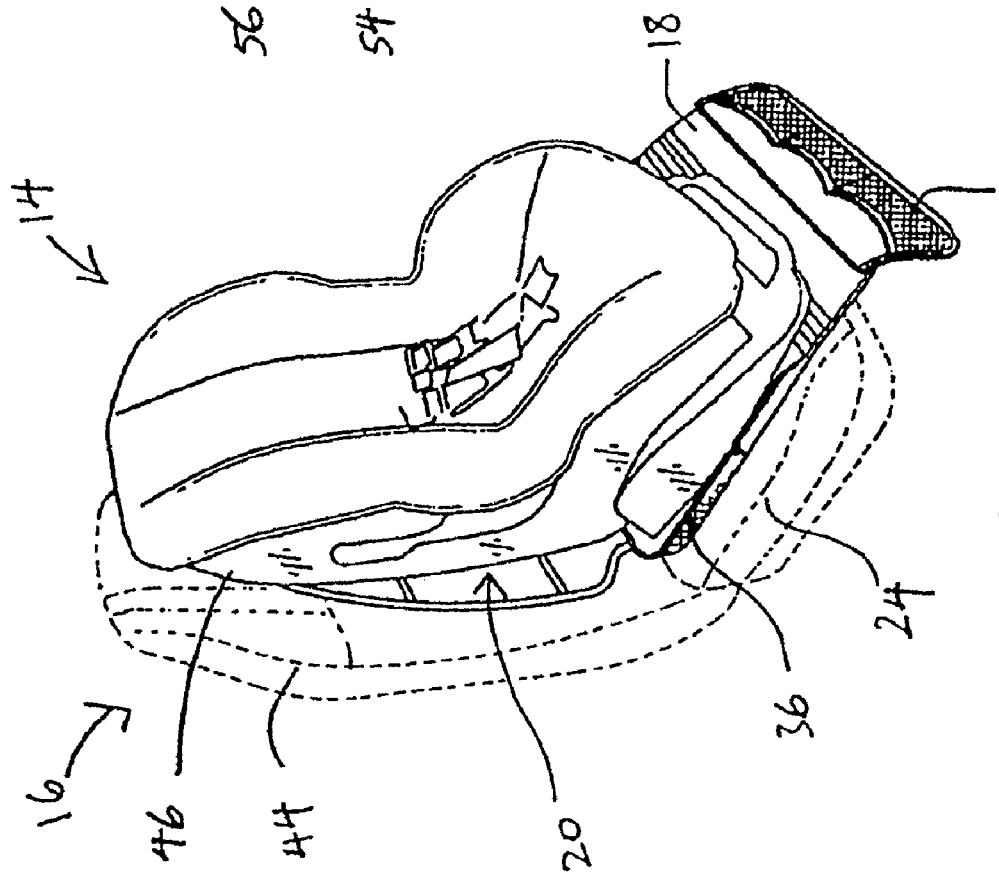

METHOD OF REDUCING AND UNIFORMLY DISTRIBUTING COMPRESSIVE FORCES ON AN AUTOMOBILE SEAT

PRIORITY INFORMATION

This application is a divisional of U.S. patent application Ser. No. 11/291,431, filed Dec. 1, 2005, which is a continuation of U.S. patent application Ser. No. 10/818,759, filed Apr. 6, 2004, now abandoned, which is a continuation of U.S. patent application Ser. No. 10/136,507, filed May 1, 2002, now U.S. Pat. No. 6,786,546, the entire contents of these applications being hereby incorporated by reference herein.

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to seat covers, and more particularly to an improved, two-stage seat cover which transitions from a one-piece system for accommodating a rear-facing child safety chair to a two-piece system for accommodating a forward-facing one to prevent a seat from being soiled and permanently compressed thereby.

Child safety chairs have been marketed throughout the world for many years. It is now mandatory within the United States for parents to employ child safety chairs when traveling in vehicles so that their children are safe in case an unfortunate event such as a car accident should occur.

Child safety chairs on seats are typically positioned in two directions depending upon the age and/or weight of the child using it. The safety chair is typically placed to face toward the vehicle's rear when it is used upon a small infant generally up to six months of age. As the infant matures in age and weight (i.e., six months up to eight years or eighty pounds in weight), the child safety chair is usually turned around so that it faces toward the front of the vehicle.

Existing safety restraints such as lap and shoulder belts are typically utilized to harness the child safety chairs to the vehicular seats. However, a significant problem exists in that the weight of these chairs are continuously applied upon the vehicular seats, thereby often causing permanent compression damages thereto. The degree of permanent compression damage can drastically increase given the fact that the weight of infant or child has to be accounted for in addition to the safety chair's weight. Most parents have found such damage to be simply unacceptable as they permanently deforms the seats of their vehicles.

Further marring to the vehicular seats can occur when infants or children using the child safety chairs inadvertently soil the seats, for example, by diaper leaks on accidental spilling of their drinks and/or food.

To alleviate these problems, many parents resort to using seat coverings such as plastic sheets, rubber mats and foam padded blankets between the vehicular seats and the child safety chairs. Though these seat coverings generally achieve their primary objective of protecting vehicular seats, they possess certain deficiencies which detract for their overall utility.

Perhaps the greatest deficiency of such coverings is their inability to protect the entirety of the vehicular seats. Specifically, plastic sheets, rubber mats and padded blankets are essentially tailored to cover only the seating portions of the vehicular seats and may be useful when accommodating a rearward-facing safety chair as it distributes weight solely on the seating portion of the vehicular seat. However, when the chair is repositioned to be forward-facing, these coverings typically cannot prevent the chair from further contacting the exposed seat-back portion of the vehicular seat thereby inevitably dispersing its weight thereto. Although multiple layers of plastic sheets, rubber mats or padded blankets may theoretically be spread over the seats, such arrangement will be aesthetically unpleasing, not to mention being awkward and difficult to maintain as they are not designed for such use.

In view of the above-described shortcomings of conventional vehicular seat coverings, there exists a need in the art for a vehicular seat cover that can optimally accommodate both rearward and forward facing child safety chairs, the directions of which are critical at various stages of a child's growth. More specifically, there exists a need for a vehicular seat cover which can prevent vehicular seats from becoming soiled and permanently compressed irrespective of the orientations that the child safety chairs take.

BRIEF SUMMARY OF THE INVENTION

The present invention specifically addresses and alleviates the above-referenced deficiencies associated with the use of the seat coverings of the prior art. More particularly, the present invention is an improved, two-stage seat cover which may easily alternate between one-piece and two-piece configurations so as to accommodate both rear and forward facing child safety chairs. As will be demonstrated below, the present seat cover's adaptability to transition between such configurations allows an infant and/or child to be safely carried within a vehicle, while preventing the vehicular seats from being damaged by accidental soiling or permanent compressions caused by the weight-bearing child safety chairs.

In accordance with a preferred embodiment of the present invention there is provided a two-stage seat cover for preventing a vehicular seat from being soiled or permanently deformed by a child safety chair which continuously applies its weight thereupon. The seat cover of the present invention comprises a lower rigid/semi-rigid protective member which is disposable upon a seating portion of the vehicular seat. The lower protective member is specifically designed for accommodating a rearward-facing safety chair as it is solely the chair's base section that contacts and thus applies weight to the seat at the seating portion. By using the lower protective member between the safety chair and the seating portion, the weight of the chair is distributed over the entire surface area of the protective member to thereby reduce any force generated by the weight from deforming the seating portion. Hence, the seating portion is prevented from suffering any permanent compression deformation.

The lower protective member additionally includes a lower peripheral edge which forms a ridge-like configuration substantially therearound. This ridge may be formed by shaping the lower peripheral edge in that configuration, or alternatively, by selectively extending an elongate strip around the lower peripheral edge. If the latter step is taken, the strip should be fabricated from a rigid or semi-rigid material (e.g., rubber) so that a configuration of a ridge is maintained at all times. By providing the ridge, any spills such as spilled drinks or diaper leaks originating from the child safety chair are maintained within the ridge and on the top surface of the protective member to prevent them from contacting and soiling any part of the seat and/or vehicular interiors.

Optionally, at least one pocket may be provided on the lower forward edge part of the lower protective member. Such pocket(s) may be any type which can adequately hold various items (e.g., baby bottles, toys, etc.) therein such as a mesh pocket, for example. The pocket may be attached to the lower forward edge by multiple means such as hook-and-loop strips (commonly called the Velcro) or by simply using permanent fasteners.

In the preferred embodiment of the present invention, the seat cover also features an upper protective member which is selectively attachable to the lower protective member and is disposable against a seat-back portion of the vehicular seat. The upper protective member is specifically designed to be used in combination with the lower protective member for accommodating a forward-facing safety chair as it further applies its weight to the seat-back portion of the seat in addition to the seating portion. By providing the upper protective member when desired, the force generated by the weight of the forward-facing chair may similarly be more evenly distributed thereby so as to replace localized compression forces on the seat-back portion of the vehicle seat. Thus, the seat-back portion, as well as the seating portion, can be protected from becoming permanently deformed by the continuous weight imposed by the child safety chair.

The upper and lower protective members may be releasibly attached to each other through one of many known conventional methods. One of such preferred methods is employing the hook-and-loop fastening (commonly called Velcro). More specifically, a hook strip can be formed adjacent the upper bottom edge of the upper protective member, whereas a loop strip can be formed adjacent the lower rear edge of the lower protective member. However, one of ordinary skill in the art will recognize that an alternate arrangement may also be possible where the hook strip is defined adjacent the lower rear edge and the loop strip is defined adjacent the upper bottom edge. By utilizing this hook-and-loop arrangement, the upper protective member can easily and conveniently be attachable and detachable with respect to the lower protective member.

In operation, the present two-stage seat cover is used according to a child's growth progression for the purpose of accommodating a child safety chair upon a vehicular seat. As mentioned above, a parent typically utilizes the safety chair in a rearward-facing direction when his or her child is in the infant stage (i.e., below six months of age). To accommodate the rearward-facing safety chair, the parent may solely lay the lower protective member on the seat's seating portion such that the rearward-facing safety chair can be accommodated thereupon substantially within its formed ridge-like configuration. In this respect, the risk of permanent compression damage to the seating portion is significantly mitigated as the force generated by the chair's weight is more uniformly distributed by the lower protective member. Of course, any spillage originating from the safety chair will be contained within the vertical barrier formed by the lower member's ridge configuration.

When the infant matures in age and weight (i.e., six months up to eight years or eighty pounds in weight), the child safety chair must be turned around so that it now faces the front of the vehicle. In order to further prevent the weight of the forward-facing chair from being directly applied to the seat's seat-back portion, the upper protective member is disposed therebetween. More particularly, the upper member's hook strip can be abutted to the lower member's loop strip for releasible attachment between the upper and lower protective members. By doing so, further weight applied to the seat-back portion by the forward-facing chair is sufficiently distributed by the upper protective member so as to protect against permanent compression damage.

BRIEF DESCRIPTION OF THE DRAWINGS

These as well as other features of the present invention will become more apparent upon reference to the drawings wherein:

FIG. 1 is a perspective view of a two-stage seat cover constructed in accordance with a preferred embodiment of the present invention disposed upon a vehicular seat;

FIG. 2 is a perspective view of a lower protective member of the seat cover shown in FIG. 1 and illustrating its placement on the seat's seating portion to accommodate a rearward-facing child safety chair thereupon;

FIG. 3 is a perspective view of the seat cover of FIG. 1 formed by attaching an upper protective member to the lower protective member of FIG. 2 and illustrating a forward-facing child safety chair which is accommodated thereupon; and FIG. 4 is an exploded perspective view of the seat cover of FIG. 1 and illustrating its hook and loop strips for releasibly attaching the lower and upper protective members together and attaching an optional storage pocket.

DETAILED DESCRIPTION OF THE INVENTION

Referring now to the drawings wherein the showings are for purposes of illustrating preferred embodiments of the present invention only, and not for purposes of limiting the same, FIG. 1 perspectively illustrates a two-stage seat cover 10 constructed in accordance with a preferred embodiment of the present invention. As indicated above, the present seat cover 10 can easily alternate between one-piece and two-piece configurations for accommodating both rear and forward facing child safety chairs 12, 14. As will be come more apparent infra, this ability to transition between such configurations helps prevent a vehicular seat 16 such as a car seat from being damaged by accidental soiling or permanent compressions caused by the weight-bearing child safety chairs 12, 14. It is recognized herein that the present seat cover 10 may be utilized with other types of seats other than vehicular seats 16.

Referring more particularly to FIGS. 1 and 4, the seat cover 10 of the present invention is comprised of a lower protective member 18 and an upper protective member 20. Although those figures specifically show the lower and upper protective members 18, 20 as being generally rectangular, it will be recognized by one of ordinary skill in the art that any shapes, configurations, sizes and/or geometries that can substantially accommodate the safety chair 12 or 14 thereupon are contemplated herein. Additionally, the lower and upper protective member 18, 20 may provide a variety forms of textures. However, it is preferred that the lower and upper protective members 18, 20 are each fabricated from a rigid or semi-rigid material that additionally possesses tactile frictionally grip properties, and/or provides at least some degree of cushioning to, the child safety chair 12 or 14. An exemplary material for this purpose is a polymer, foamed polymer and/or foam rubber, but other foamed polymer and/or materials are expressly contemplated herein. Optionally, a washable protective cover 22 such as the one made of a nylon fabric may encapsulate the lower and upper protective members 18, 20 so as to protect their materials from being soiled by a spillage for example.

Referring now to FIG. 2 only, the lower protective member 18 is adapted to be disposed upon a seating portion 24 of the vehicular seat 16. The lower protective member 18 accommodates a rearward-facing safety chair 12 by itself as it is only the chair's base section 26 which contacts and thus applies weight to the seating portion 24. By being placed between the safety chair 12 and the seating portion 24, the lower protective member 18 operates to more uniformly distribute the chair weight and infant weight across the surface area of the seating portion 24. Hence, the risk of permanent compression damage to the seating portion 24 is significantly mitigated.

The lower protective member 18 preferably includes a lower peripheral edge 28 which defines the outer boundaries thereof. The lower peripheral edge 28 is generally formed by a lower forward edge 30 (disposed away from the upper protective member 20), a lower rear edge 32 (disposed toward the upper member 20) and two lower side edges 34 interconnecting them. Although not mandatory, the lower peripheral edge 28 forms a ridge-like configuration 36 substantially therearound (i.e. except its lower forward edge 30). However, an alternate configuration forms the ridge 36 around the entirety of the lower peripheral edge 28.

The ridge 36 may be integrally having various heights with the lower protective member 18. Alternatively, an elongate strip 38 may be selectively extended around the lower peripheral edge 28 to form the desired ridge 36. In this latter embodiment, such strip 38 is preferably constructed from a rigid or semi-rigid material (e.g., polymer on rubber) so that the configuration of a ridge 36 can be sustained irrespective of various pressures impacting the same. By providing this ridge 36, any spills such as spilled drinks or diaper leaks originating from the child safety chair 12 or 14 can be contained within the boundary set thereby to prevent them from flowing out and soiling any part of the seat 16 and/or vehicular interior.

Optionally, the lower protective member 18 may have at least one storage pocket 40 which may be extended from its lower forward edge 30. The pocket(s) 40 may be any type of pocket which can adequately hold various items (e.g., baby bottles, toys, etc.) therein. One example of such pocket may be a mesh pocket which defines from one to any number of sufficiently deepened pouches. The pocket(s) 40 may be remarkably mounted to the lower forward edge 30 in any conventional manner such as using hook-and-loop or fasteners and/or snaps or zippers. Furthermore, the lower protective member 18 may optionally include at least one folding line 42 which extends between the two lower side edges 34. This folding line(s) 42 allows the lower protective member 18 to be folded so as to facilitate carrying thereof when it is not in use and further better accommodate any curvature the seat portion 24.

Referring now to FIGS. 1, 3 and 4, the upper protective member 20 is configured to be disposed against a seat-back portion 44 of the vehicular seat 16. The upper protective member 20 is used in combination with the lower protective member 18 so that a forward-facing child safety chair 14 can be accommodated collectively thereby. The upper protective member 20 is adapted to be generally contiguous with the surface of the seat-back portion 44. In this regard, when the child safety chair 14 is placed in the forward-face direction, the chair's top section 46 further contacts and thus applies its weight thereto in addition to the chair's base section 26 applying weight to the seating portion 24.

It is preferred that the upper protective member 20 can be selectively attachable with and detachable from the lower protective member 18. By providing the upper protective member 20 when desired, the compressive force generated by the weight of the forward-facing chair 14 may be more uniformly distributed upon the entire surface area of the seat portion 44 so as to lessen the continuous impact of the chair 14 at the seat-back portion 44. Therefore, the seat-back portion 44 of the vehicular seat 16, as well as its seating portion 24, can be adequately protected from becoming permanently deformed by the continuous weight respectively imposed by the top and base sections 46, 26 of the forward-facing child safety chair 14.

The upper protective member 20 has an upper peripheral edge 48 defining the outer boundaries thereof. The upper peripheral edge 48 is characterized by an upper top edge 50 (disposed away from the lower protective member 18), an upper bottom edge 52 (disposed toward the lower protective member 18) and two upper side edges 54 interconnecting them. The upper protective member 20 may optionally have at least one folding line 56 that can extend between the two upper side edges 54 which allows it to similarly be folded for ease of carrying and conform to the curvature of the seat portion 44. Further optional is a trimming 58 which may be extended between the upper side edges 54 through the upper top edge 50. Although this trimming 58 may be any type or form, it is preferably a nylon fabric trimming. Moreover, a person of ordinary skill in the art will recognize that a variety of indicia such as company names, designs or logos may be inscribed within the upper peripheral edge 48.

As illustrated in FIG. 4, the upper and lower protective members can be releasibly attached to each other by preferably employing the hook-and-loop strips (commonly called the Velcro) formed therebetween. However, one of ordinary skill in the art will realize that such releasible attachment may be accomplished via other known conventional methods (e.g., releasible pins, buttons, etc.). In particular, a hook strip 60 is formed adjacent the upper bottom edge 52 of the upper protective member 20. A loop strip 62 is formed adjacent the lower rear edge 32 of the lower protective member 18. It is easily contemplated, however, that the positioning of the hook and loop strips 60, 62 be reversed such that the hook strip 60 is formed adjacent the lower rear edge 32 and the loop strip 62 is formed adjacent the upper bottom edge 52. By utilizing this hook-and-loop arrangement, the upper protective member 20 can easily and conveniently be attached and detached with respect to the lower protective member 18.

In operation, the present two-stage seat cover 10 is used according to a child's growth progression and accommodates a child safety chair 12, 14 upon a vehicular seat 16 without inflicting any damage thereto. Typically, a parent positions the safety chair 12 in a rearward-facing direction when his or her child is in the infant stage (i.e., below six months of age). In this scenario, the lower protective member 18 is used without the upper protective member 20 and is placed upon the seating portion 24. The rearward-facing child safety chair 12 may then be set upon the lower protective member 18 substantially within its formed ridge-like configuration 36. By doing so, the risk of permanent compression damage to the seating portion 24 is significantly reduced as the force generated by the chair's weight is more uniformly distributed by (i.e. disbursed) the lower protective member 18. Of course, any spillage (i.e., spilled drinks, diaper leakage) coming from the child safety chair 12 or 14 will be contained within ridge 36 as it forms a vertical substantially around the lower peripheral edge 28.

As the infant matures in age and weight (i.e., six months up to eight years or eighty pounds in weight), the child safety chair 14 must be turned around so that it now faces the front of the vehicle. The upper protective member 20 is placed between the chair's top section 46 and the seat-back portion 44 to alleviate the weight of the forward-facing chair 14 from being directly applied to the seat-back portion 44. To accomplish such end, the upper member's hook strip 60 is releasibly attached to the lower member's loop strip 62. In this respect, weight applied to the seat-back portion 44 by the forward-facing chair 14 can be sufficiently distributed by the upper protective member 20 in order to protect against permanent compression damages. The upper protective member 20 is easily detachable for adaptation toward the rearward-facing chair 12 so that the present seat cover 10 can be reused for other infants (e.g., younger siblings).

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A method of reducing and uniformly distributing compressive forces on an automobile seat resulting from the presence of a child safety seat situated thereon, the method comprising:
   positioning a lower protective member on a seat bottom section of an automobile seat, the lower protective member comprising a lower cushioned portion and being configured to generally conform to the shape of an adjacent surface of an automobile seat; and
   wherein the lower protective member is configured to be positioned on an automobile seat when a child safety seat has a rear-facing or a forward-facing orientation;
   positioning an upper protective member on a seat back section of an automobile seat, the upper protective member comprising an upper cushioned portion and being configured to generally conform to the shape of an adjacent surface of an automobile seat;
   wherein the upper protective member is separable from and non-integral with the lower protective member and is configured to be positioned on an automobile seat when a child safety seat has a forward-facing orientation;
   wherein the upper protective member remains generally vertically against a seat back section of an automobile seat when no child safety seat is situated thereon;
   wherein the upper protective member is configured to be selectively positioned adjacent to the lower protective member; and
   selectively removing the upper protective member, leaving only the lower protective member on a seat bottom section when a rear-facing child safety seat is positioned on the lower protective member.

2. The method of claim 1, wherein the upper protective member comprises an upper end, the upper end extending to a height along a seat back section so as to prevent any contact between the seat back section and a forward-facing child safety.

3. The method of claim 1, wherein at least one of the lower protective member and the upper protective member comprises a rigid or semi-rigid material.

4. The method of claim 1, wherein the lower protective member comprises a tactile material configured to provide frictional resistance between the lower protective member and an adjacent surface of a child safety seat.

5. The method of claim 1, wherein at least one of the lower protective member and the upper protective member comprises at least one folding line configured to permit the lower protective member or the upper protective member to generally conform to the shape of an adjacent surface of an automobile seat.

6. The method of claim 1, wherein at least one of the lower protective member and the upper protective member comprises a protective covering material.

7. The method of claim 6, wherein the protective covering material comprises nylon fabric.

8. The method of claim 1, wherein the lower protective member comprises a peripheral edge for spill containment.

9. The method of claim 1, wherein the lower protective member comprises a pocket, the pocket configured to hold at least one item.

10. The method of claim 1, further comprising the step of attaching the lower protective member to the upper protective member.

11. The method of claim 1, wherein the lower protective member is configured to contact the lower protective member when a child safety seat is portioned on the seat cover in a forward-facing orientation.

12. A method of reducing compressive forces on an automobile seat resulting from the presence of a child safety seat positioned thereon, the method comprising:
    providing a lower protective member of a seat cover upon a seat bottom section of an automobile seat, the lower protective member comprising a lower cushioned portion and being configured to be situated between a child safety seat and a seat bottom section of an automobile seat when a child safety seat is placed on the lower protective member in a rear-facing orientation;
    positioning the lower protective member on a seat bottom section of an automobile seat;
    placing a child safety seat at least partially against the lower protective member of the seat cover in a rear-facing orientation;
    compressively securing a child safety seat onto the lower protective member;
    distributing the compressive forces substantially uniformly upon a seat bottom section of an automobile seat;
    providing an upper protective member of the seat cover upon an seat back section of an automobile seat, the upper protective member comprising an upper cushioned portion and being configured to be situated between a child safety seat and a seat back section of an automobile seat when a child safety seat is placed on the upper protective member in a forward-facing orientation;
    positioning the upper protective member on a seat back section of an automobile seat; and
    placing a child safety seat at least partially against the upper protective member of the seat cover in a forward-facing orientation.

13. The method of claim 12, further comprising selectively removing the upper protective member, leaving only the lower protective member on a seat bottom section when a rear-facing child safety seat is positioned on the lower protective member.

14. The method of claim 12, wherein at least one of the lower protective member and the upper protective member comprises a rigid or semi-rigid material.

15. The method of claim 12, wherein the lower protective member comprises a tactile material configured to provide frictional resistance between the lower protective member and an adjacent surface of a child safety seat.

16. The method of claim 12, wherein at least one of the lower protective member and the upper protective member comprises at least one folding line configured to permit the lower protective member or the upper protective member to generally conform to the shape of an adjacent surface of an automobile seat.

17. The method of claim 12, wherein at least one of the lower protective member and the upper protective member comprises a protective covering material.

18. The method of claim 17, wherein the protective covering material comprises nylon fabric.

19. The method of claim 12, wherein the lower protective member comprises a peripheral edge for spill containment.

20. A method of reducing compressive forces on an automobile seat resulting from the presence of a child safety seat situated thereon, the method comprising:

positioning a lower protective member on a seat bottom section of an automobile seat, the lower protective member comprising a lower cushioned portion and a tactile material configured to provide frictional resistance between the lower protective member and an adjacent surface of a child safety seat; and positioning an upper protective member on a seat back section of an automobile seat, the upper protective member comprising an upper cushioned portion and a tactile material configured to provide frictional resistance between the upper protective member and an adjacent surface of a child safety seat;

wherein the upper protective member is configured to be selectively positioned adjacent to the lower protective portion;

wherein the lower protective member is configured to be positioned on an automobile seat when a child safety seat has a rear-facing or a forward-facing orientation;

wherein the upper protective member is configured to be positioned on an automobile seat when a child safety seat has a forward-facing orientation;

removing the upper protective member for storage when a child safety seat has a rear-facing orientation; and repositioning the upper protective member when a child safety seat has a forward-facing orientation.

21. The method of claim 20, wherein at least one of the lower protective member and the upper protective member comprises at least one folding line configured to permit the lower protective member or the upper protective member to generally conform to the shape of an adjacent surface of an automobile seat.

22. The method of claim 20, wherein at least one of the lower protective member and the upper protective member comprises a rigid or semi-rigid material.

* * * * *